(12) United States Patent
Ackermann et al.

(10) Patent No.: US 7,975,965 B2
(45) Date of Patent: Jul. 12, 2011

(54) WING TIP JOINT IN AIRFOILS

(75) Inventors: James F. Ackermann, Woodinville, WA (US); Richard B. Tanner, Seattle, WA (US)

(73) Assignee: The Boeing Company, Chicago, IL (US)

( * ) Notice: Subject to any disclaimer, the term of this patent is extended or adjusted under 35 U.S.C. 154(b) by 592 days.

(21) Appl. No.: 12/119,898

(22) Filed: May 13, 2008

(65) Prior Publication Data
US 2009/0283639 A1    Nov. 19, 2009

(51) Int. Cl.
*B64C 5/00* (2006.01)
(52) U.S. Cl. .......................................... 244/124; 244/131
(58) Field of Classification Search .................. 244/124, 244/131, 123.1, 49
See application file for complete search history.

(56) References Cited

U.S. PATENT DOCUMENTS

| | | | | |
|---|---|---|---|---|
| 2,881,994 A | * | 4/1959 | Michael | 244/124 |
| 3,118,639 A | * | 1/1964 | Kiceniuk | 244/219 |
| 5,558,299 A | * | 9/1996 | Veile | 244/49 |
| 5,924,649 A | * | 7/1999 | Piening et al. | 244/123.1 |
| 6,270,039 B1 | * | 8/2001 | Linjama | 244/213 |
| 7,097,133 B2 | * | 8/2006 | Elam | 244/3.29 |
| 2002/0100840 A1 | * | 8/2002 | Billinger et al. | 244/131 |
| 2004/0079839 A1 | * | 4/2004 | Bath et al. | 244/131 |
| 2007/0018049 A1 | * | 1/2007 | Stuhr | 244/124 |
| 2009/0218446 A1 | * | 9/2009 | McAlinden et al. | 244/131 |
| 2009/0272848 A1 | * | 11/2009 | Munday | 244/131 |
| 2009/0302159 A1 | * | 12/2009 | Pajard | 244/124 |

* cited by examiner

*Primary Examiner* — Christopher P Ellis
(74) *Attorney, Agent, or Firm* — Yee & Associates, P.C.

(57) ABSTRACT

An aircraft joint comprises a wing structure and a wing tip. The wing structure has a first part of a clevis and lug fastening system located around an outer end of the wing structure. The wing tip has a second part of the clevis and lug fastening system located around an end of the wing tip. The wing tip is capable of being joined to the outer end of the wing structure. An upper aerodynamic surface and a lower aerodynamic surface are formed by joining the wing structure and the wing tip. The first part and the second part are located about a center between the upper aerodynamic surface and the lower aerodynamic surface. The first part and the second part engage each other such that a moment reaction occurs around the upper aerodynamic surface and the lower aerodynamic surface.

18 Claims, 9 Drawing Sheets

WING TIP JOINT IN AIRFOILS

BACKGROUND INFORMATION

1. Field

The present disclosure relates generally to aircraft and in particular to structural components in aircraft. Still more particularly, the present disclosure relates to a method and apparatus for a wing tip joint in an airfoil.

2. Background

An airfoil is a shape of an aerodynamic structure, such as a wing, a blade, or a sail. The airfoil may be a cross sectional shape of the aerodynamic structure. The airfoil shape of a wing of an aircraft when moved through air produces a force perpendicular to the motion called lift. Typically, an airfoil may have a round leading edge followed by a sharp trailing edge.

In marketing aircraft, performance is an important parameter or factors. One manner in which performance may be increased is through making the shape of an airfoil thinner. The reduction in the thickness of an airfoil results in less aerodynamic drag.

The reduction in the thickness or cross section of the airfoil also reduces the amount of room available for structural components within the airfoil. Also, the wing tips at the ends of the wing may require repairs or replacement. Some aircraft are capable of safe flight without a wing tip, although performance may be reduced. As a result, it is desirable to have a removable and/or replaceable wing tip to facilitate repairs.

Systems are present to attach a wing tip to a thin airfoil shape in the manner that these wing tips can be removable and carry loads.

Currently, joints are used for providing removability and load transfer for wing tips. These joints include, for example, shear joints, tension joints, and pin joints. Shear joints are overlapping joints that use multiple fasteners. Tension joints use ribs back to back with a series of tension bolts holding the ribs together. Typically, one row of tension bolts may be at the top, while a second row may be at the bottom of the airfoil shape. Pin joints provide a lug and clevis at the top of the airfoil shape and another lug and clevis at the bottom of the airfoil shape.

Thus, it would be advantageous to have a method and apparatus that overcomes the problems described above.

SUMMARY

In one advantageous embodiment, an aircraft joint comprises a wing structure and a wing tip. The wing structure has a first part of a clevis and lug fastening system located around an outer end of the wing structure. The wing tip has a second part of the clevis and lug fastening system located around an end of the wing tip. The wing tip is capable of being joined to the outer end of the wing structure. An upper aerodynamic surface and a lower aerodynamic surface are formed by joining the wing structure and the wing tip. The first part and the second part are located about a center between the upper aerodynamic surface and the lower aerodynamic surface. The first part and the second part engage each other such that a moment reaction occurs around the upper aerodynamic surface and the lower aerodynamic surface.

In another advantageous embodiment, an apparatus comprises a first support structure and a second support structure. The first support structure has a first part of a center hinge unit located at a first end of the first support structure. The second support structure has a second part of the center hinge unit located at a first end of the second support structure. The second support structure is capable of being joined to the first end of the first support structure. The first support structure and the second support structure form a first surface and a second surface about opposite to the first surface when the first support structure is engaged with the second support structure. The first part and the second part are located between the first surface and the second surface and the first part and the second part engage each other such that a moment of force occurs around the first surface and the second surface.

In yet another advantageous embodiment, a method is present for attaching a wing tip to a wing structure. The wing tip is engaged to the wing structure, wherein the wing structure has a first part of a clevis and lug fastening system located around an outer end of the wing structure and the wing tip has a second part of the clevis and lug fastening system located around an end of the wing tip in which the wing tip is capable of being joined to the outer end of the wing structure, an upper aerodynamic surface and a lower aerodynamic surface is formed by joining the wing structure and the wing tip, the first part and the second part are located about a center between the upper aerodynamic surface and the lower aerodynamic surface, and the first part and the second part engage each other such that a moment reaction occurs around the upper aerodynamic surface and the lower aerodynamic surface. The first part of the clevis and lug fastening system is fastened to the second part of the clevis and lug fastening system with a set of fasteners.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
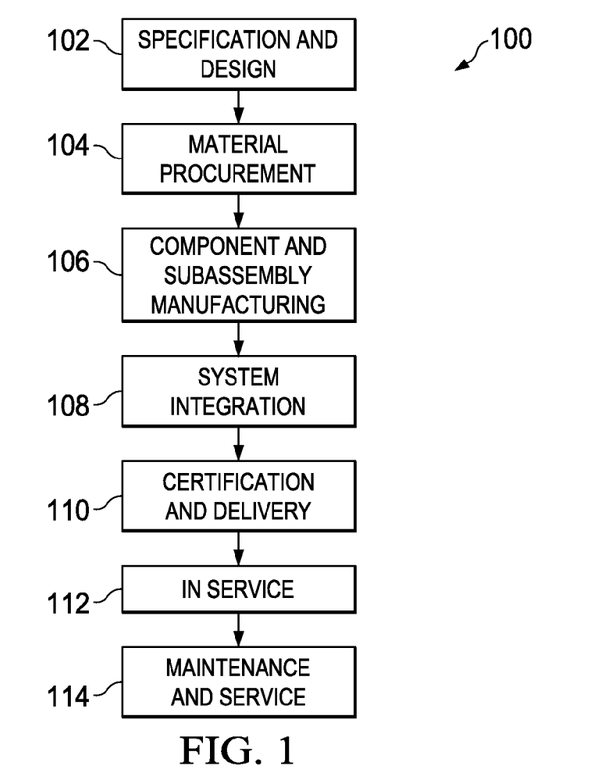
FIG. 1 is a diagram illustrating an aircraft manufacturing and service method in which an advantageous embodiment may be implemented.
Figure 2:
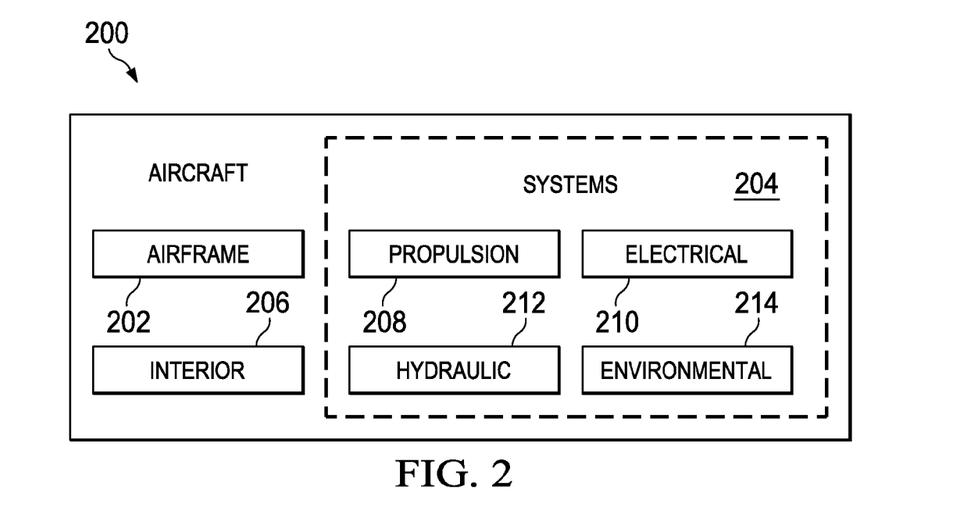
FIG. 2 is a diagram of an aircraft which an advantageous embodiment may be implemented.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

Although these joints provide for the transfer of wing loads, the different advantageous embodiments recognize that they may be impractical for interchangeability and/or performance. Shear joints are impractical with respect to interchangeability because of the cost to drill the number of fasteners to the tolerances needed to provide the desired interchangeability.

The different advantageous embodiments recognize that tension joints may function sufficiently to meet interchangeability requirements. This type of joint; however, has a requirement for the bolt centerlines to be placed within the airfoil shape. The load carried by the tension bolts may be limited to the distance between the upper and lower bolts because this distance reacts to the bending moment. Further, physical space limitations may be present in how these tension bolts are located, depending on the skin thickness, rib thickness, and rib fillet radius. As a result, tension bolts may not carry as much wing bending load as other joint designs.

The different advantageous embodiments also recognize that a pinned joint requires two lugs and devises to be located within or close to the aerodynamic surface. The load carried by the lug and clevis may be limited to the distance between the upper and lower pins because this distance reacts to the bending moment.

In other words, one lug and clevis is located close to an upper aerodynamic surface and another lug and clevis is located close to the lower aerodynamic surface. The different advantageous embodiments recognize that this type of configuration reduces the load that can be carried. In essence, the different advantageous embodiments recognize that much of the load with this type configuration is placed on the fasteners used to attach lugs to the devises.

In view of the disadvantages of currently used joints to attach wing tips to wings, the different advantageous embodiments provide a method and apparatus for an aircraft joint. The aircraft joint has a wing structure with the first part of a clevis and lug fastening system located at an outer end of the wing structure. A wing tip having a second part of the clevis and lug fastening system is located at an end of the wing tip in which the end of the wing tip is capable of being joined to the outer end of the wing structure.

The joining of the wing structure and the wing tip form an upper aerodynamic surface and a lower aerodynamic surface. The first part and the second part are located around a center and/or mid point between the upper aerodynamic surface and the lower aerodynamic surface. The first part and the second part engage each other such that a moment reaction occurs around the upper aerodynamic surface and the lower aerodynamic surface.

Figure 3:
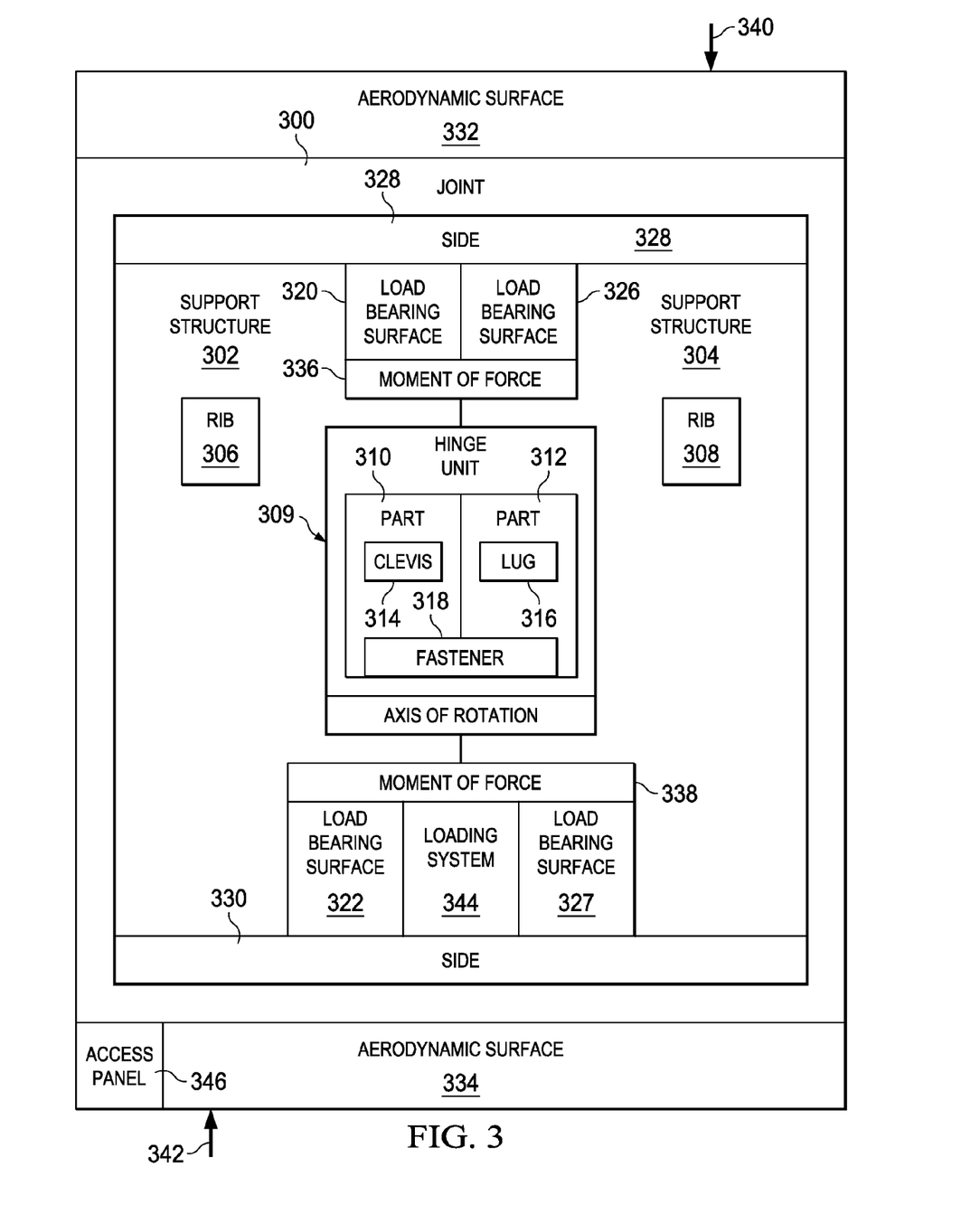
FIG. 3 is a block diagram of a joint in accordance with an advantageous embodiment.

Turning now to FIG. 3, a block diagram of a joint is depicted in accordance with an advantageous embodiment. Joint 300 is an example of a joint that may be used in aircraft 200 in FIG. 2. In particular, joint 300 may be used within airframe 202 in FIG. 2. In this example, joint 300 includes support structure 302 and support structure 304. Support structure 302 may take the form of rib 306, and support structure 304 may take the form of rib 308. Of course, in other advantageous embodiments, the support structures may take other forms, such as a truss, fitting, frame, or other suitable structure.

As illustrated, joint 300 also includes hinge unit 309. Hinge unit 309 includes part 310 and part 312. Part 310 and part 312 are designed to engage each other. Part 310 may be formed as part of support structure 302 and part 312 may be formed as part of support structure 304. In other advantageous embodiments, part 310 and part 312 may be attached to support structure 302 and support structure 304, respectively. Part 310 and part 312 may take various forms. For example, part 310 may be clevis 314, while part 312 may be lug 316.

In these examples, clevis 314 is a shaped component with holes through which a fastener may be placed to secure another component, such as lug 316. Lug 316 is a component that has a hole which may be aligned with the holes in clevis 314. Part 310 and part 312 may be fastened or held together using fastener 318. In this particular example, fastener 318 passes through or channels clevis 314 and lug 316 to fasten clevis 314 and lug 316 to each other. Fastener 318 may take various forms, such as, for example, a pin, a bolt, or some other suitable component.

As illustrated, support structure 302 has load bearing surface 320 and load bearing surface 322. Support structure 304 includes load bearing surface 326 and load bearing surface 327. Load bearing surface 320 and load bearing surface 326 are located at or around side 328 of support structure 302 and support structure 304. Load bearing surface 322 and load bearing surface 327 are located at or around side 330 of support structure 302 and support structure 304.

Load bearing surface 320 and load bearing surface 326 may engage each other when forces are applied to support structures 302 and 304. In a similar manner, load bearing surface 322 and load bearing surface 327 also may engage each other when a load is applied to support structures 302 and 304.

In joint 300, hinge unit 309 is located in the middle or around halfway between side 328 and side 330. In this manner, hinge unit 309 is between or around the middle with respect to aerodynamic surface 332 and aerodynamic surface 334. In these examples, aerodynamic surface 332 and aerodynamic surface 334 may be, for example, wing panels attached to and/or secured to support structures, such as support structure 302 and support structure 304.

This location of hinge unit 309 within support structure 302 and support structure 304 results in moment of force 336 being applied around side 328. In other words, moment of force 336 may occur when load bearing surface 320 and load bearing surface 326 engage each other. In a similar fashion, the location of hinge unit 309 also may result in moment of force 338 occurring around side 330. More specifically, moment of force 338 may occur around load bearing surface 322 and load bearing surface 327.

Hinge unit 309 provides a point of rotation for a moment arm. In these examples, moment of force 336 and moment of force 338 are pseudo-vector quantity that represents a magnitude of force applied to rotational system at a distance from the axis of rotation formed by hinge unit 309. A moment of force may be also referred to as a moment.

As the moment arm is decreased in length, more force is applied to load bearing surfaces 320, 326, 322, and 327. Load bearing surfaces 320, 326, 322, and 327 have the capability to react to increased loads.

When a force is applied to aerodynamic surface 332 in the direction of arrow 340, moment of force 338 may occur at load bearing surface 322 and load bearing surface 327. If force is applied on aerodynamic surface 334 in the direction of arrow 342, moment of force 336 may occur around load bearing surface 320 and load bearing surface 326 based on the design of joint 300. In these examples, loading system 344 provides pretension so load bearing surfaces 320, 326, 322, and 327 are always in contact under deflection.

In these examples, loading system 344 may be employed to pretension force on load bearing surface 320 and load bearing surface 326. Loading system 344 may take various forms. For example, loading system 344 may be, for example, a compression block, a compression bolt, and/or a reaction pin. In other words, loading system 344 may provide force to push support structure 302 and support structure 304 away from each other around side 330. With hinge unit 309 being located between or centrally with respect to side 330 and side 328, force may occur between support structures 302 and 304 around side 328. In particular, in these examples, this force may occur at or around load bearing surfaces 320 and 326. These forces cause bending loads on joint 300.

Thus, joint 300 may provide adequate reaction for bending loads in a thin airfoil shape. Further, access to hinge unit 309 may be made through access panel 346 on aerodynamic surface 334. Access panel 346 may allow access to hinge unit 309 for easier installation and removal of fastener 318. The block diagram illustrated in FIG. 3 is not meant to provide limitations in the manner in which different components may be implemented or arranged.

In other advantageous embodiments, different components may be used in place of and in addition to the ones illustrated. For example, in other advantageous embodiments, support structure 302 and support structure 304 may not take the form of ribs. Examples of other support structures include, for example, sailboat masts, hydrofoil blades, and windmill blades using frames or intercostals.

Also, although only a single hinge unit is shown, other numbers of hinge units may be employed in joint 300. For example, 3, 5, or 7 hinge units may be used in joint 300. These additional hinge units may be located along the length of support structures 302 and 304 between sides 328 and 330. The number of additional hinge units used may vary depending on the loading and redundancy that is desired for joint 300.

Figure 4:
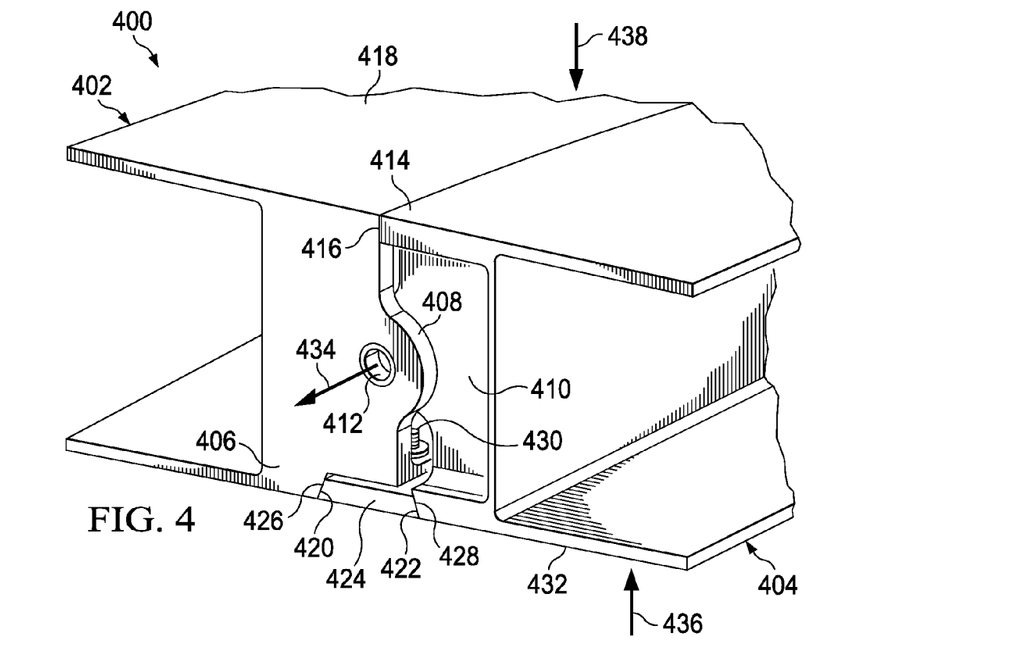
FIG. 4 is a diagram illustrating a joint in accordance with an advantageous embodiment.

With reference now to FIG. 4, a diagram illustrating a joint is depicted in accordance with an advantageous embodiment. Joint 400 is an example of one implementation of joint 300 in FIG. 3. In this example, joint 400 may be implemented to attach a wing tip to a wing.

In this example, joint 400 is formed by securing and/or attaching rib 402 to rib 404. Rib 402 and rib 404 are examples of support structures, such as support structures 302 and 304 in FIG. 3. In this example, hinge unit 406 includes clevis 408 and lug 410. As can be seen, in this illustrative example, clevis 408 and lug 410 form a first part and a second part of a clevis and lug system. Clevis 408 and lug 410 may engage each other as illustrated. These two components may be secured to each other by passing a fastener through bore 412, which extends through both clevis 408 and lug 410.

In this illustrative example, clevis 408 and lug 410 are formed as part of rib 402 and rib 404. In other advantageous embodiments, these components may be separate components that may be attached to rib 402 and rib 404.

In this example, load bearing surface 414 is located on rib 402, while load bearing surface 416 is located on rib 404. These two load bearing surfaces may engage each other when force is applied to either or both rib 402 and rib 404 through various forces applied to the wing and/or wing tip of the aircraft. These load bearing surfaces are located around or about top side 418 of joint 400.

Also, rib 402 has load bearing surface 420, and rib 404 has load bearing surface 422. These load bearing surfaces may engage compression block 424. More specifically, load bearing surface 420 may engage load bearing surface 426 on compression block 424 and load bearing surface 422 may engage load bearing surface 428 on compression block 424. In this example, compression block 424 may be attached or fastened to rib 402 using fastener 430. These load bearing surfaces are located at bottom side 432 of joint 400.

In this illustrative example, lug 410 and clevis 408 form a lug and clevis system that is an example of a hinge unit, such as hinge unit 309 in FIG. 3. Clevis 408 and lug 410 are located between top side 418 and bottom side 432. In particular, these components are located around the middle or around halfway between top side 418 and bottom side 432.

In this example, an axis for moment forces is located through bore 412 as indicated by arrow 434. The moment forces may occur around or near top side 418 and/or bottom side 432, depending on the force being applied to rib 402 and/or rib 404. For example, moment forces may occur around load bearing surface 414 and load bearing surface 416.

Moment forces also may occur around load bearing surfaces 420 and load bearing surfaces 426. Moment forces also may occur around load bearing surface 422 and load bearing surface 428. Moment forces may occur around the load bearing surfaces on top side 418 in response to force being applied to bottom side 432 in the direction of arrow 436. This force may be applied on rib 402 and/or rib 404 on bottom side 432.

Moment forces may occur around bottom side 432 in response to forces being applied in the direction of arrow 438 on top side 418. These forces also may be applied to either or both rib 402 and rib 404.

Figure 5:
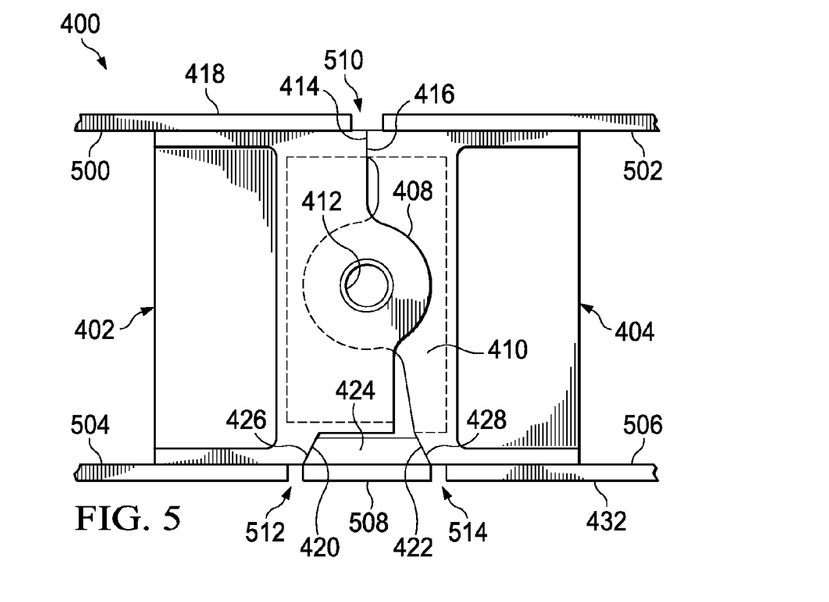
FIG. 5 is a side view of a joint in accordance with an advantageous embodiment.

With reference now to FIG. 5, a side view of a joint is depicted in accordance with an advantageous embodiment. In this example, the view is a side view of joint 400 in FIG. 4. In this example, upper wing skin 500, upper wing skin 502, lower wing skin 504, and lower wing skin 506 are attached to top side 418 and bottom side 432 of joint 400.

Additionally, fairing 508 is attached to compression block 424. As can be seen, in this example, gap 510, gap 512, and gap 514 are present. These gaps allow for flexing when moment forces occur. This side view provides another view of bore 412 through which a moment axis may be present.

Figure 6:
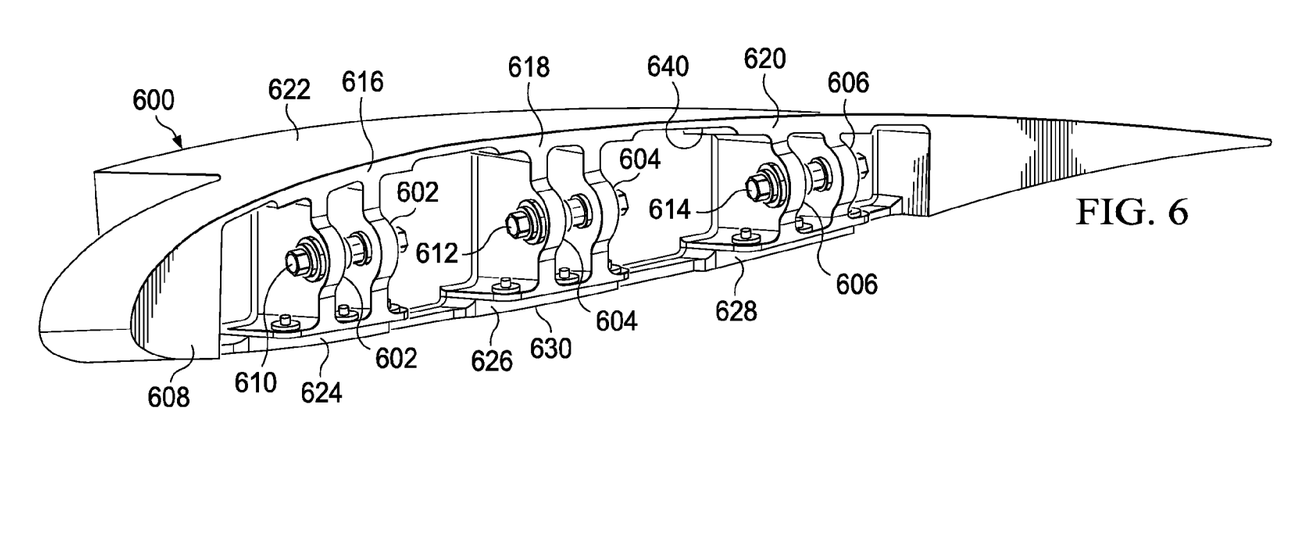
FIG. 6 is a diagram illustrating a portion of a wing in accordance with an advantageous embodiment.

With reference now to FIG. 6, a diagram illustrating a portion of a wing is depicted in accordance with an advantageous embodiment. In this example, wing 600 is an example of a portion of a wing having an airfoil shape. In this example, wing 600 includes devises 602, 604, and 606 within rib 608. As depicted, fasteners 610, 612, and 614 are located within devises 602, 604, and 606, respectively. Rib 608 includes load bearing surfaces 616, 618, and 620 on top side 622. Additionally, rib 608 includes load bearing surfaces 624, 626, and 628 near bottom side 630.

Although pins are shown in FIG. 6, these fasteners are typically not inserted until after rib 608 has been placed with a matching rib for a wing tip, in these examples. For example, although wing 600 is described as having load bearing surfaces 616, 618, and 620, these load bearing surfaces may be part of a single load bearing surface for flange 640 in FIG. 6.

Figure 7:
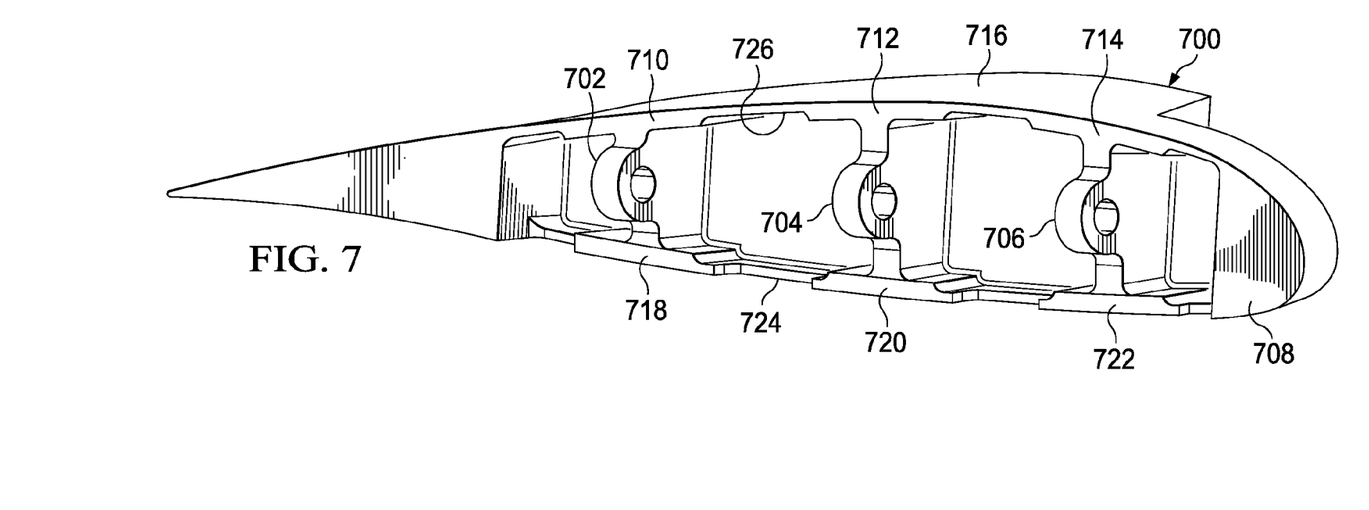
FIG. 7 is an illustration of a portion of a wing tip in accordance with an advantageous embodiment.

With reference now to FIG. 7, illustration of a portion of a wing tip is depicted in accordance with an advantageous embodiment. In this example, wing tip 700 is an example of a wing tip that may be engaged with wing 600 in FIG. 6. Lugs 702, 704, and 706 are present within rib 708. These lugs may engage devises, such as devises 602, 604, and 606 in FIG. 6, to attached wing tip 700 to wing 600. Rib 708 includes load bearing surfaces 710, 712, and 714 on top side 716.

Additionally, load bearing surfaces 718, 720, and 722 are present near bottom side 724. In these examples, the load bearing surfaces may be continuous to each other on top side 716 and bottom side 724 depending on the implementation. For example, load bearing surfaces 710, 712, and 714 may be part of a single load bearing surface formed by flange 726.

Figure 8:
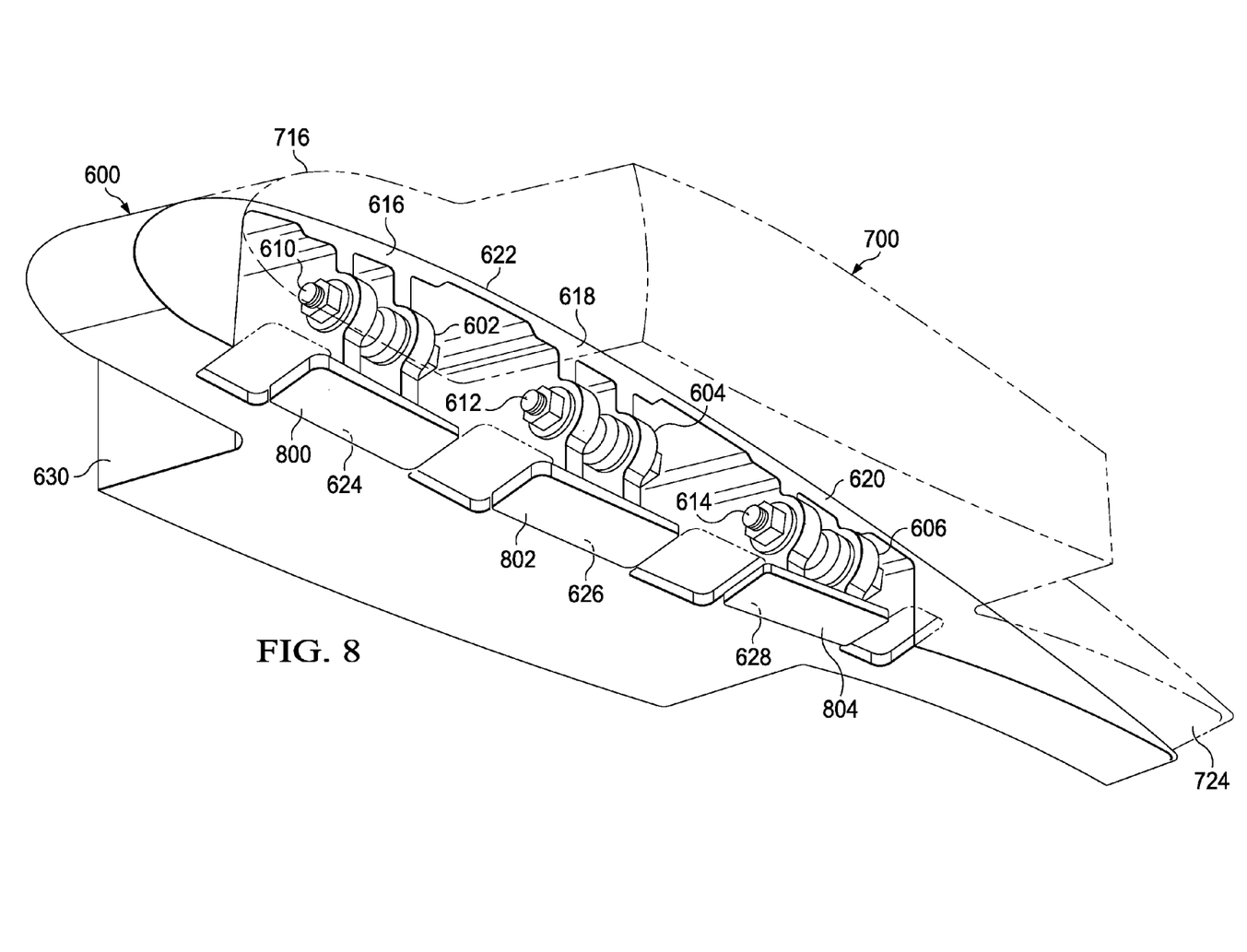
FIG. 8 is a diagram illustrating a wing tip engaged to a wing in accordance with an advantageous embodiment.

With reference next to FIG. 8, a diagram illustrating a wing tip engaged to a wing is depicted in accordance with an advantageous embodiment. In this example, wing 600 is illustrated as being engaged to wing tip 700. Wing tip 700 is shown in phantom, in this example, to illustrate lug and clevis locations. Additionally, compression blocks 800, 802, and 804 are illustrated with respect to the different load bearing surfaces.

Figure 9:
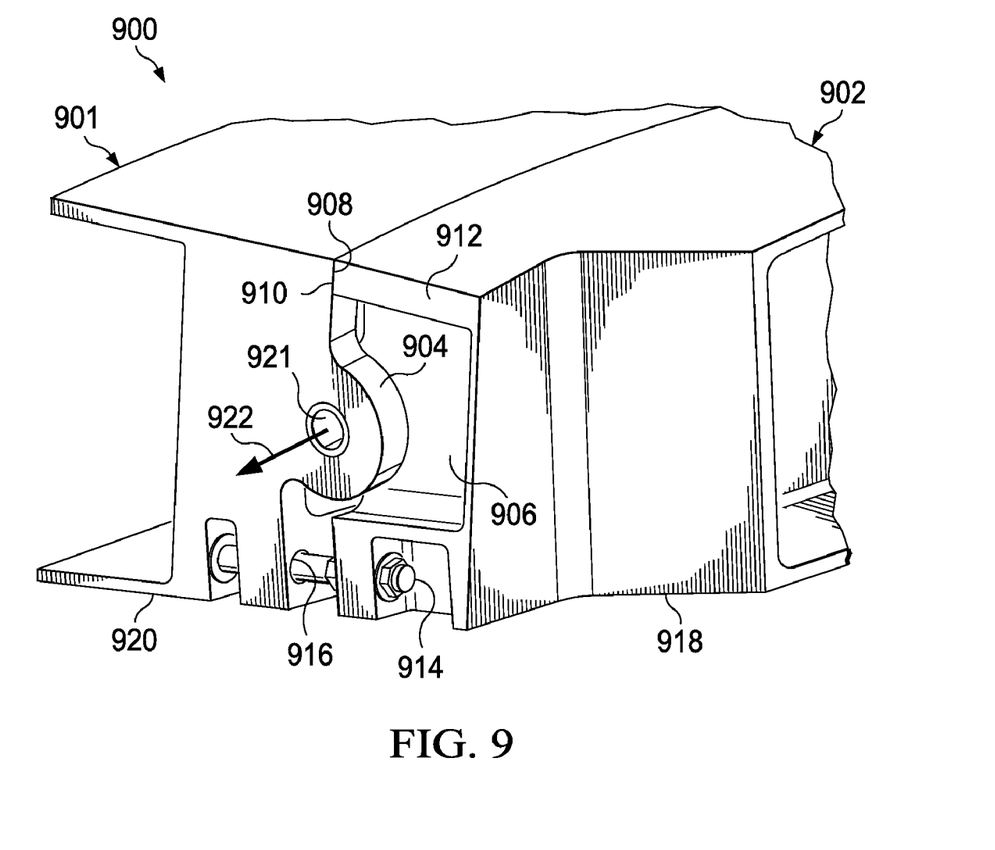
FIG. 9 is a diagram illustrating a joint in accordance with an advantageous embodiment.

With reference now to FIG. 9, a diagram illustrating a joint is depicted in accordance with an advantageous embodiment. In this example, joint 900 is an example of an implementation of joint 300 in FIG. 3 and includes rib 901 and rib 902.

In this example, rib 901 includes clevis 904, while rib 902 includes lug 906. This configuration is similar to the one illustrated in FIG. 4. As illustrated, rib 901 includes load bearing surface 908, and rib 902 includes load bearing surface 910. Load bearing surface 910 is part of flange 912 in these examples.

The preloading of load bearing surfaces 908 and 910, in these examples, may be set or implemented using pin 914, which may engage rib 901 through channel 916 to push bottom side 918 of rib 902 away from bottom side 920 of rib 901 to generate preloading of force between load bearing surfaces 908 and 910. These compression forces may be generated around an axis through bore 921 as illustrated by arrow 922.

Figure 10:
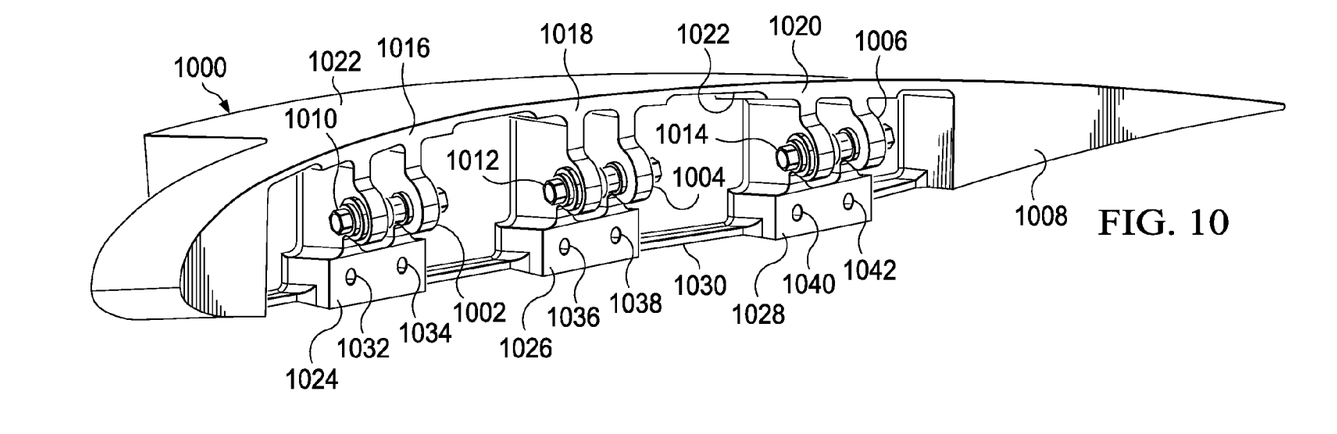
FIG. 10 is a diagram illustrating a portion of a wing in accordance with an advantageous embodiment.

With reference now to FIG. 10, a diagram illustrating a portion of a wing is depicted in accordance with an advantageous embodiment. In this example, wing 1000 includes devises 1002, 1004, and 1006, which are formed as part of rib 1008, in these examples. These devises are illustrated with fasteners 1010, 1012, and 1014 in place. Typically, these fasteners are not put in place until after the wing tip has been attached to the wing.

In this example, wing 1000 has load bearing surfaces 1016, 1018, and 1020 near top side 1022. Additionally, wing 1000 also has load bearing surfaces 1024, 1026, and 1028 near bottom side 1030. In this particular example, the load bearing surfaces on top side 1022 may be preloaded through the use of pins placed into load bearing surfaces 1024, 1026, and 1028 located near bottom side 1030. These pins may be placed into channels 1032, and 1034 on load bearing surface 1024, channels 1036, and 1038 in load bearing surface 1026, and channels 1040 and 1042 in load bearing surface 1028.

Figure 11:
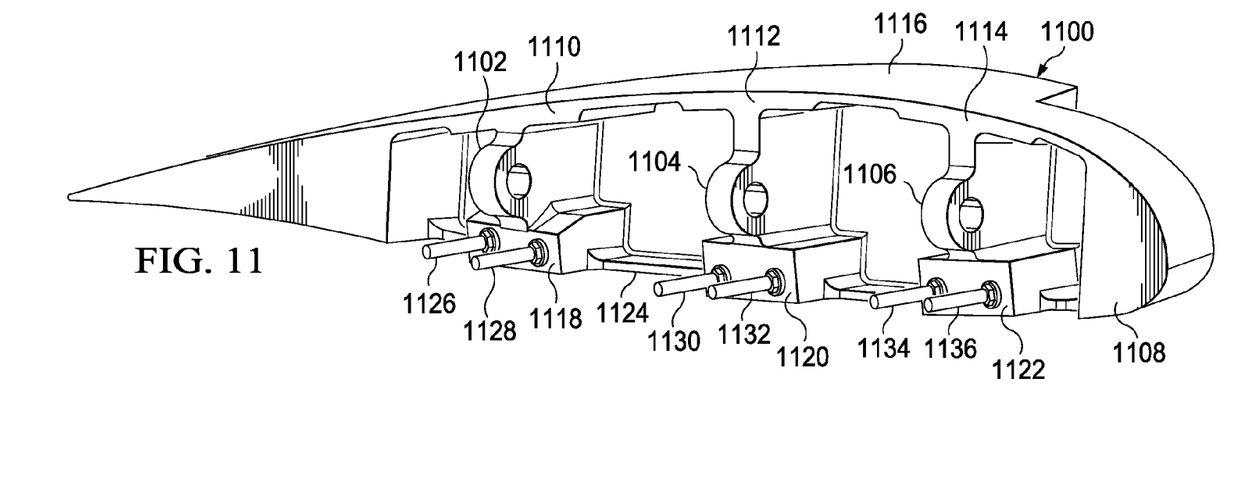
FIG. 11 is a diagram illustrating a portion of a wing tip in accordance with an advantageous embodiment.

With reference now to FIG. 11, a diagram illustrating a portion of a wing tip is depicted in accordance with an advantageous embodiment. In this example, wing tip 1100 may engage wing 1000 in FIG. 10. As illustrated, wing tip 1100 includes lugs 1102, 1104, and 1106 as part of rib 1108. Additionally, rib 1108 also has load bearing surfaces 1110, 1112, and 1114 located near top side 1116. Rib 1108 also has load bearing surfaces 1118, 1120, and 1122 located on bottom side 1124.

Pins 1126 and 1128 extend from load bearing surface 1118, pins 1130 and 1132 extend from load bearing surface 1120, and pin 1134 and 1136 extend from load bearing surface 1122. These pins may engage channels 1042, 1040, 1038, 1036, 1034, and 1032 respectively, as illustrated in FIG. 10 to provide preloading to the load bearing surfaces near top side 1022 of wing 1000 and load bearing surfaces near top side 1116 of wing tip 1100.

Figure 12:
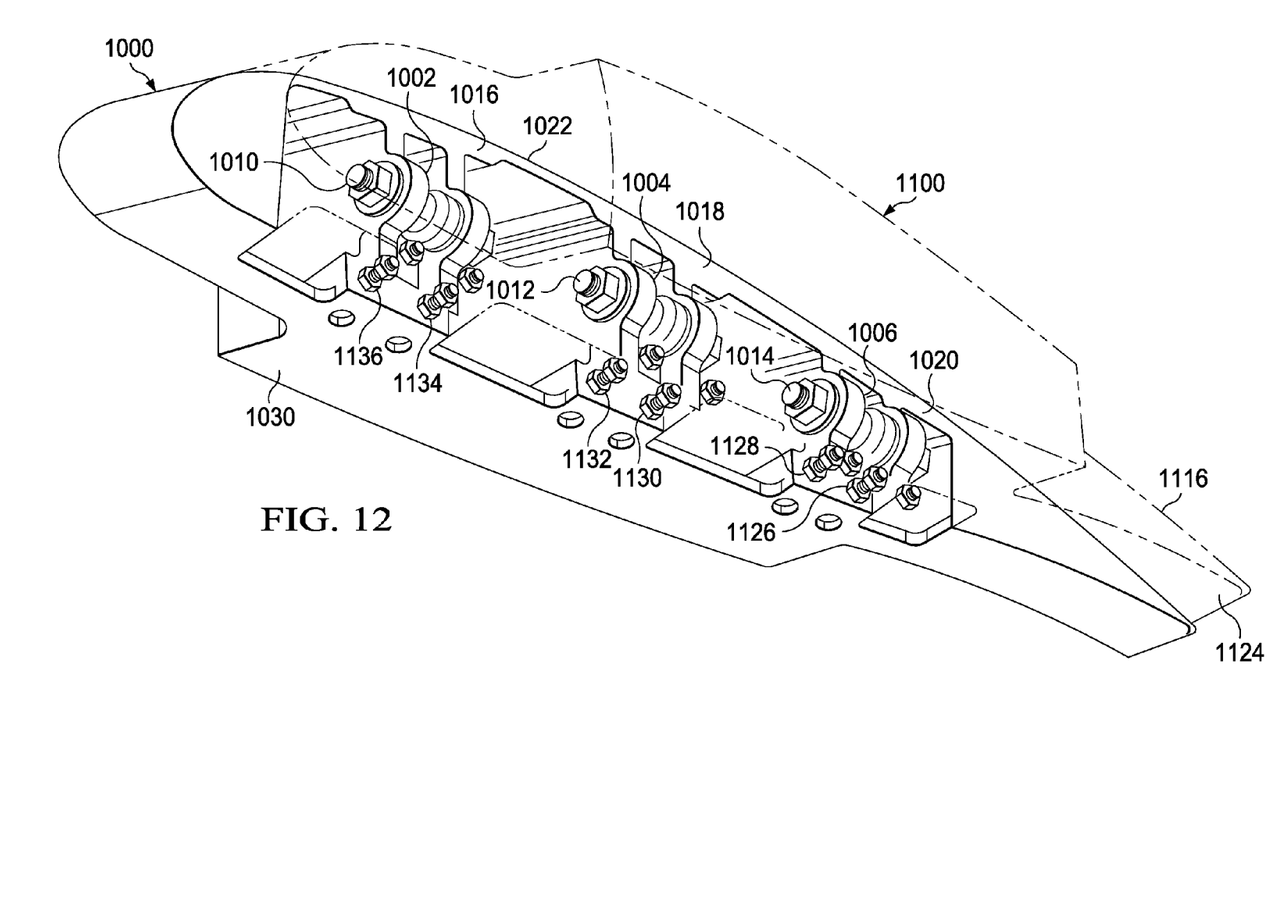
FIG. 12 is a diagram illustrating a wing tip engaged to a wing in accordance with an advantageous embodiment.

With reference now to FIG. 12, a diagram illustrating a wing tip engaged to a wing is depicted in accordance with an advantageous embodiment. In this example, wing 1000 is engaged with wing tip 1100. Wing tip 1100 is shown in phantom in various locations to illustrate the location of pins within the channels, as well as the location of how different load bearing surfaces may engage each other.

In the different illustrative examples, three clevis and lug systems are illustrated for use in attaching a wing tip to a wing. In other advantageous embodiments, other numbers of lug and clevis systems may be used. For example, in some embodiments, only a single lug and clevis may be used. This type of implementation may not be a typical one with multiple devises and lugs being employed to provide for additional strength and redundancy. For example, in other advantageous embodiments, five, ten, or eighteen clevis and lug systems may be implemented.

Figure 13:
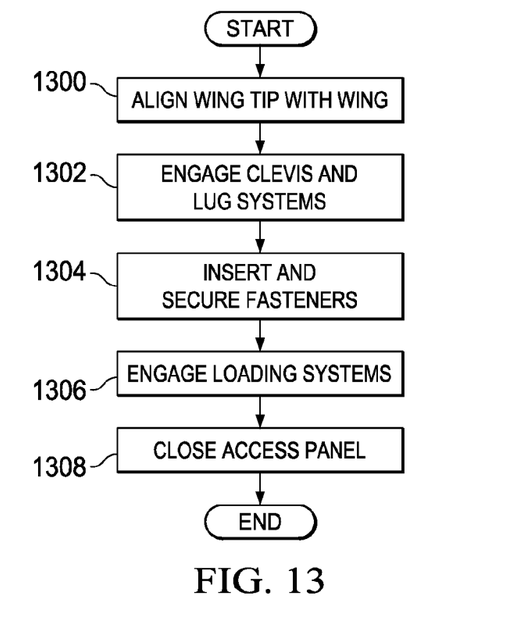
FIG. 13 is a flowchart of a process for attaching a wing tip to a wing in accordance with an advantageous embodiment.

With reference now to FIG. 13, a flowchart of a process for attaching a wing tip to a wing is depicted in accordance with an advantageous embodiment. The process illustrated in FIG. 13 may be implemented to attach a wing tip to a wing, such as, for example, attaching wing tip 700 in FIG. 7 to wing 600 in FIG. 6.

The process begins by aligning a wing tip with a wing (operation 1300). The clevis and lug systems are engaged (operation 1302). Fasteners are inserted and secured to engage the clevis and lug systems (operation 1304). The process engages the loading systems (operation 1306). Operations 1304 and 1306 may be performed through an opening within the wing or wing tip. Thereafter, an access panel for the opening is closed (operation 1308), with the process terminating thereafter.

Figure 14:
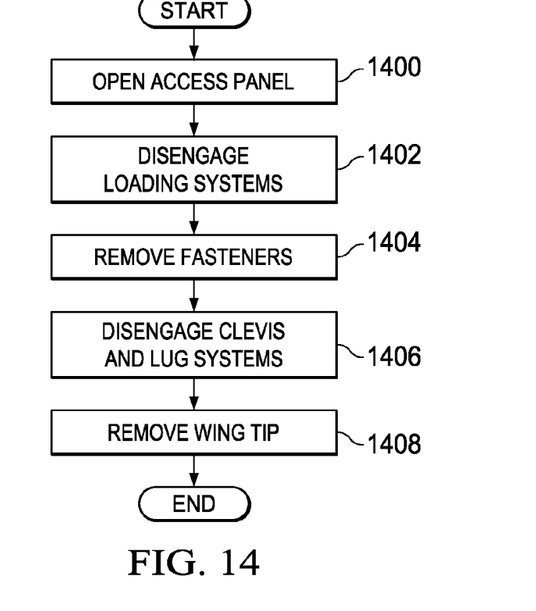
FIG. 14 is a flowchart of a process for removing a wing tip from a wing in accordance with an advantageous embodiment.

With reference now to FIG. 14, a flowchart of a process for removing a wing tip from a wing is depicted in accordance with an advantageous embodiment. The process illustrated in FIG. 14 may be used to remove a wing tip, such as wing tip 700 in FIG. 7 from wing 600 in FIG. 6.

The process begins by opening an access panel (operation 1400). This access panel allows access to the interior of the wing and the wing tip. The process disengages the loading systems (operation 1402). This operation may remove a pretension system, such as compression block 424 in FIG. 4 or pin 914 in FIG. 9. The process removes the fasteners from the devises and lugs (operation 1404). The process disengages the clevis and lug systems (operation 1406). The wing tip is then removed from the wing (operation 1408), with the process terminating thereafter.

In these different examples, the different operations illustrated in FIGS. 13 and 14 are examples of steps that may be implemented to attach and remove a wing tip from a wing. Of course, other operations may be used in addition to or in place of those shown in these figures. For example, operations 1308 and 1406 may be optional if a loading system is not present. Further, other steps may be performed in aligning the wing with the wing tip or engaging the wing to the wing tip not related to the hinge system formed by the devises and lugs.

The description of the different advantageous embodiments have been presented for purposes of illustration and description, and is not intended to be exhaustive or limited to the embodiments in the form disclosed. For example, the different examples have been described with respect to a joint for an aircraft wing. Other embodiments may be applied to joining or creating joints for other types of structures.

For example, without limitation, the joints illustrated in these examples may be used in a windmill blade, a rudder of an aircraft, a rudder for a ship, a diving plane for a submarine, and other suitable structures. Many modifications and variations will be apparent to those of ordinary skill in the art. For example, the different advantageous embodiments show a single type of loading system in different implementations.

One advantageous embodiment, for example, illustrates the use of compression blocks while another advantageous embodiment illustrates the use of pins and holes in a loading system. In other advantageous embodiments, a mixture of these types of loading systems may be present within a single joint. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft joint comprising:
    a wing structure having a first part of a clevis and lug fastening system located around an outer end of the wing structure, wherein the first part of the clevis and lug fastening system is attached to a rib in the wing structure; and
    a wing tip having a second part of the clevis and lug fastening system located around an end of the wing tip, wherein the wing tip is capable of being joined to the outer end of the wing structure, an upper aerodynamic surface and a lower aerodynamic surface formed by joining the wing structure and the wing tip, the first part and the second part are located about a center between the upper aerodynamic surface and the lower aerodynamic surface, and the first part and the second part engage each other such that a moment reaction occurs around the upper aerodynamic surface and the lower aerodynamic surface.

2. The aircraft joint of claim 1, wherein the moment reaction occurs around the upper aerodynamic surface at upper load bearing surfaces and around the lower aerodynamic surface at lower load bearing surfaces in a first support structure in the wing structure and a second support structure in the wing tip.

3. The aircraft joint of claim 1, wherein the clevis and lug fastening system further comprises a set of fasteners capable of securing the first part to the second part.

4. The aircraft joint of claim 1, wherein the first part comprises a set of devises and the second part comprises a set of lugs.

5. The aircraft joint of claim 1, wherein the first part of the clevis and lug fastening system is formed as part of the rib in the wing structure.

6. The aircraft joint of claim 1, wherein the wing structure and the wing tip are for a thin wing.

7. The aircraft joint of claim 1 further comprising:
    a loading system, wherein the loading system biases a load on upper load bearing surfaces between the wing structure and the wing tip associated with the upper aerodynamic surface.

8. The aircraft joint of claim 7, wherein the loading system comprises:
    a set of compression blocks.

9. The aircraft joint of claim 8, wherein the loading system comprises:
    a set of compression pins.

10. An apparatus comprises:
    a first support structure having a first part of a center hinge unit located at a first end of the first support structure, wherein the first support structure is a rib in a wing; and
    a second support structure having a second part of the center hinge unit located at a first end of the second support structure, wherein the second support structure is a rib in a wing tip, wherein the second support structure is capable of being joined to the first end of the first support structure, the first support structure and the second support structure form a first surface and a second surface about opposite to the first surface when the first support structure is engaged with the second support structure, the first part and the second part are located between the first surface and the second surface, and the first part and the second part engage each other such that a moment of force occurs around the first surface and the second surface.

11. The apparatus of claim 10, wherein the center hinge unit is a clevis and lug system.

12. The apparatus of claim 10 further comprising:
a loading system, wherein the loading system biases a load on first load bearing surfaces between the first support structure and the second support structure associated with the first surface.

13. The apparatus of claim 12, wherein the loading system comprises:
a set of compression blocks.

14. The apparatus of claim 12, wherein the loading system comprises:
a set of compression pins.

15. The apparatus of claim 10, wherein the first surface is a first aerodynamic surface and the second surface is a second aerodynamic surface.

16. The apparatus of claim 10, wherein the first support structure and the second support structure form a joint for a wing of an aircraft.

17. A method for attaching a wing tip to a wing structure, the method comprising:
engaging the wing tip to the wing structure, wherein the wing structure has a first part of a clevis and lug fastening system located around an outer end of the wing structure, wherein the first part of the clevis and lug fastening system is attached to a rib in the wing structure, and the wing tip has a second part of the clevis and lug fastening system located around an end of the wing tip in which the wing tip is capable of being joined to the outer end of the wing structure, an upper aerodynamic surface and a lower aerodynamic surface are formed by joining the wing structure and the wing tip, the first part and the second part are located about a center between the upper aerodynamic surface and the lower aerodynamic surface, and the first part and the second part engage each other such that a moment reaction occurs around the upper aerodynamic surface and the lower aerodynamic surface; and
fastening the first part of the clevis and lug fastening system to the second part of the clevis and lug fastening system with a set of fasteners.

18. The method of claim 17 further comprising:
biasing a load on upper load bearing surfaces between the wing structure and the wing tip associated with the upper aerodynamic surface using a loading system.

* * * * *